Sept. 17, 1974   N. E. PONTECORVO   3,836,684
METHOD AND APPARATUS FOR PREPARATION OF RICOTTA CHEESE
Filed May 21, 1973
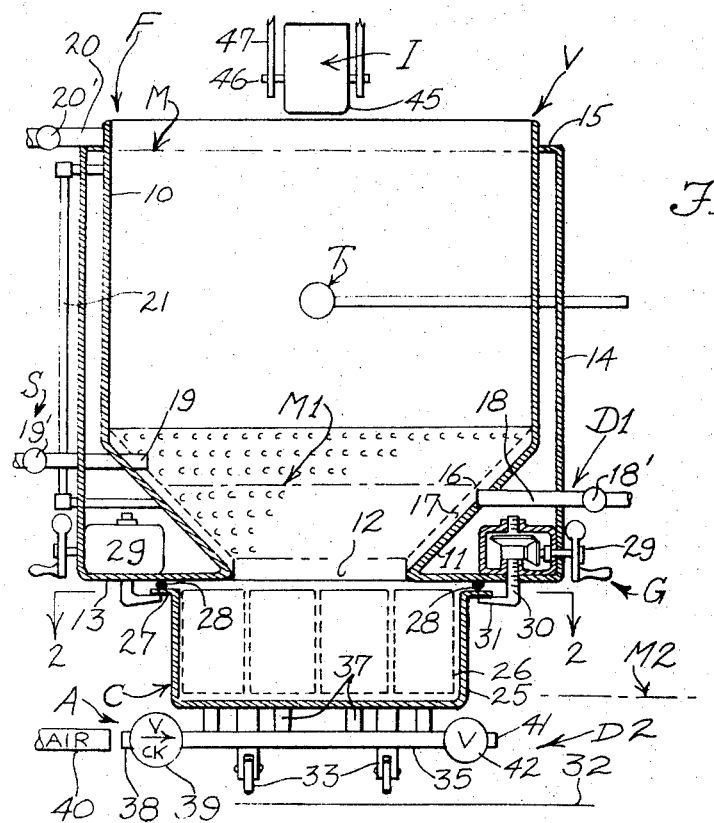

United States Patent Office 3,836,684
Patented Sept. 17, 1974

3,836,684
METHOD AND APPARATUS FOR PREPARATION OF RICOTTA CHEESE
Nicholas E. Pontecorvo, 18075 Ventura Blvd.,
Encino, Calif. 91316
Continuation-in-part of applications Ser. No. 39,721, May 22, 1970, now Patent No. 3,741,773, Ser. No. 121,709, Mar. 8, 1971, now Patent No. 3,732,110, and Ser. No. 193,469, Oct. 28, 1971, now abandoned. This application May 21, 1973, Ser. No. 362,279
The portion of the term of the patent subsequent to May 8, 1990, has been disclaimed
Int. Cl. A23c 19/02
U.S. Cl. 426—361  16 Claims

ABSTRACT OF THE DISCLOSURE

Ricotta cheese is prepared using a method and apparatus wherein a heated body of whey or milk or both is treated in a processing vat by injection of acid to develop curd which is allowed to separate and rise to the surface of the body of liquor from which it has been separated. The body of liquor is then drained off, lowering the floating curd to a level where it approaches the open upper ends of a plurality of strainer-canisters assembled within a pan sealed to and communicating with a bottom opening in the vat so as to provide a closed bottom therefor. The plan is detachable from the vat and is embodied in a mobile cart in which the strainer-canisters can be transported to an unloading zone where they are removed for discharge of individual bodies of curd collected therein. At least the final stage of draining of the liquor is performed by draining through the perforations of the strainer-canisters and out of the pan so as to direct all of the curd into the canisters.

RELATED APPLICATION

This application is a continuation-in-part of my pending applications Ser. No. 39,721, filed May 2, 1970, now U.S. Pat. 3,741,773; Ser. No. 121,709, filed Mar. 8, 1971, now U.S. Pat. 3,732,110; and Ser. No. 193,469, filed Oct. 28, 1971, now abandoned, all relating to the preparation of ricotta cheese and apparatus therefor.

BACKGROUND OF THE INVENTION

Ricotta cheese, normally a product of whey residue from the processing of other cheeses, with new milk added, is customarily processed in vats of large diameter, by steeping a mixture of whey and milk at an elevated temperature, sometimes referred to as "cooking;" then charging the mixture with acid (e.g. vinegar) to curdle the mixture into a suspension of finely divided curd particles in a suspending body of whey; allowing the mixture to stand in the vat while the curd particles rise to the surface; and then skimming the floating curd from the surface of the whey body by hand ladling into a suitable receptable. The ricotta curd is very delicate and will readily disintegrate and remix with the whey body if subjected to shock from rough handling during ladling. Also, in hand-skimming from a large vat, it is difficult to capture the remaining vestiges of curd after the bulk of the curd has been ladled off. As the result of these factors, considerable proportion of the curd is lost from each batch. A related problem arises from the time consumed in the hand-skimming operation. During such operation the curd remaining in the vat is subjected to the continued cooking action of the underlying body of whey (the temperature of which remains elevated subject only to a slow, gradual heat loss) and due to the continued cooking in the presence of the acid, the character and texture of this remaining curd is gradually altered, so that the total content of skimmed-off curd is a mixture of curd portions of varying texture and quality. Thus the aggregate quality of the batch of recovered ricotta cheese is dependent upon the time consumed and the nature of the handling of the curd by the workman during the skimming operation. This is not conducive to accurate control or uniformity of product.

I have heretofore attempted to improve upon such conventional process by draining off the residual whey from a vat of suitable size and catching the floating curd in a strainer through which the whey is drained. However, I have found that a further problem arises from the weight of the volume of curd building up in a single collecting strainer of sufficiently large volume to retain all of the curd from a batch of normal size. The extremely delicate texture of ricotta curd is such that the mere weight of the collected curd body tends to break down the texture of the curd in the lower level of the collected body, and some of it tends to become intimately mixed with the whey draining through the strainer basket and because of its finely divided state, to be carried through the strainer perforations along with the whey and thus lost without any feasible possibility of being reclaimed.

I have avoided the above described difficulties to a large extent by simultaneously processing a plurality of small volumes of whey-milk mix in separate processing cells in the form of vertically standing tubes of relatively small diameter, and collecting the curd in separate bodies in relatively small strainer-canisters at the bottoms of the respective cells. This avoids the loss of curd mentioned above, and this feature is preserved in the present invention. The expensive construction involved in the use of a battery of processing cells has been largely eliminated in the present invention, and the handling and servicing of the apparatus have been correspondingly simplified and reduced in time.

SUMMARY OF THE INVENTION

The present invention combines the plurality of collecting strainer-canisters of my previous inventions with a single large processing vat in which a full batch of whey-milk is processed to develop a floating body of curd on a whey residue body which is drained off at or near the bottom of the vat, a final stage of separation being effected by draining through the several strainer-canisters which are contained side-by-side in a pan forming the bottom of the vat, whereby a plurality of small separate bodies of curd are collected and individually handled in further stages of handling.

OBJECTS OF THE INVENTION

Consonant with the foregoing, the invention has as its objects:

(1) To provide a process for producing ricotta cheese with a maximum recovery of curd from the processed mix, with maximum predictable uniformity of product;

(2) To attain these results with minimum dependency on the skill of the operator, in an apparatus of minimal complexity and minimal operational and servicing requirements;

(3) Specifically, to eliminate the necessity for hand ladling floating curd from an open processing vat;

(4) To eliminate deterioration of the curd during handling;

(5) To attain maximum simplicity and rapidity in the processing steps, consistent with control of quality and volume of recovered curd;

(6) To achieve time control in the separation of residual whey from the curd in a manner to avoid loss of curd and to preserve the quality thereof;

(7) To arrest cooking at the point of curd development so as to avoid deterioration of the curd;

(8) To attain more thorough acidification through more rapid dispersion of the acid in the whey;

(9) To obtain separate bodies of ricotta cheese directly from the strainer-collection step, so as to minimize subsequent handling steps.

DESCRIPTION

These and other objects will become apparent in the following description and appended drawings, in which:

FIG. 1 is a vertical sectional view, partially schematic, of a processing apparatus embodying the invention;

FIG. 2 is a horizontal sectional view taken on the line 2—2 of FIG. 1;

FIG. 3 is an inverted view of the canister-housing cart;

FIG. 4 is a perspective view of a strainer-canister;

FIG. 5 is a schematic fragmentary representation of a modified form of the invention.

Referring now to the drawings in detail, I have shown in FIGS. 1–3 thereof, as an example of one specific form of processing apparatus by which the invention may be attained, a processing vat V having a bottom opening which, in preparation for a processing cycle, is closed by a strainer-canister housing cart C detachably coupled to its lower end by grapple mechanism G; acid-injecting means I form which acid (e.g. vinegar) can be injected into a starting batch of whey-milk mix or of whey or milk, indicated at M, substantially filling the vat; means A for injecting air for agitation; filling means F; thermometer means T; steam injection means S; and draining means D1 and D2. The invention contemplates either preheating of the mix M before filling the vat, or heating the batch M by steam injection through S after the vat has been filled.

Vat V comprises a body 10 which is of suitable acid-resisting sheet material (e.g. stainless steel) and a lower funnel section 11 of the same material, having a bottom opening 12 defined within a flat, horizontal flange 13 extending outwardly to a jacket 14 which extends upwardly from the perimeter of flange 13 to provide insulation around the vat body 10. The upper end of jacket 14 is preferably joined to body 10 by a rim 15. Funnel section 11 has a liner 16 of perforated sheet material or equivalent screen mesh or other foraminous material, which is spaced from funnel section 11 by an annular drain space 17. A drain outlet 18 communicates with drain space 17, extending through jacket 14 and funnel section 11. Outlet 18, together with a suitable control valve 18', constitutes the drain means D1 which operates at an upper drain level M1 to which the mix may be lowered in a first stage of draining off the residual whey. On another (e.g. opposite) side of the vat, a steam injector inlet 19, with control valve 19', of the injector means S, correspondingly extends through jacket 14 and funnel section 11 (or through the wall of body 10) into the interior of vat V as shown, or may terminate in drain space 17 similarly to drain outlet 18. At the top of the vat, an inlet 20, with control valve 20' of filling means F, communicates with the vat interior through the wall of body 10. Filling means F also includes a height gage 21 attached to one side of jacket 14 and communicating with the interior of vat V as indicated. Vat V may be square or rectangular in planform as indicated in FIG. 3 in which it is viewed from the bottom, or may be cylindrical or of any other tubular or other configuration. The square shape is related to the square shape of the cart C (which will now be described) and hence is preferable, but is not a critical or essential feature of the invention.

Cart C comprises the pan 25 in which are housed a plurality of strainer-canisters 26 which may be of perforated sheet material (e.g. stainless steel) or other equivalent strainer material. Canister 26 are advantageously of square box form (FIG. 4) so as to nest within pan 25 with no waste space when the pan is correspondingly of square or rectangular box form. However, the dimensions of the canisters are such that they will be received loosely within pan 25 for easy insertion and removal, and their height is preferably such as to extend to the top of pan 25 as indicated. The horizontal area of pan 25 (interiorly) may suitably be somewhat less than half that of vat body 10 where the height of the pan is somewhat less than half its width and the height of vat body 10 is about the same as its width. Suitable processing capacity may be provided in an apparatus wherein the vat body 10 has an internal width of six feet in both directions and a height substantially the same, and wherein the pan 25 is four feet square internally and about eighteen inches in height.

Pan 25 has a rim flange 27 extending outwardly for sealing engagement with an O-ring seal 28 interposed between the flange and the under surface of vat flange 13, whereby the pan is sealed to the bottom of vat V in full open communication with its bottom opening 12, thus providing a bottom for the vat. Such sealing is provided by grapple means G comprising a plurality of lifting jacks 29 which optionally may be of screw-jacket form as indicated in FIG. 1, or may be of equivalent hydraulic jack or pneumatic form. Each jack 29 embodies a vertically movable shaft 40 terminating at its lower end in a finger 31 extending laterally inwardly for engagement beneath pan flange 27, whereby cart C may be lifted from the floor 32 and sealed to the bottom of vat V. Pan 25, when detached from vat V, is supported by rollers or casters 33 attached to its bottom, for transportation from the vat to an unloading zone. Cart C also includes a manifold 35 having a plurality of branches 36 each including a plurality of connections 37 communicating with the interior of pan 25 through its bottom, preferably at locations centered beneath the canisters 26 as assembled in the pan 25. At one end of manifold 35 is an outlet 41 normally closed by a valve 42 which, when opened, provides for draining the pan 25 and its contained canisters 26 below a bottom drain level M2. Parts 35, 36, 37, 41 and 42 are included in the lower drain means D2. At the other end of manifold 35 is an air unlet 38 having a check valve 39. Air injection means A comprises these parts and an air hose 40 adapted to be coupled to inlet 38.

Acid injecting means I, in the form shown in FIG. 1, embodies an open-top container 45 of cup form having opposed trunnions 46 pivoted in a hanger 47 which may be ceiling-suspended, the pivot axis being located at a level above the container bottom such that, when acid (e.g. vinegar) is introduced into the container in the correct volume for treatment of batch M of normal volume, the weight of the acid charge will be effective to balance container 45 in an upright position from which, when manually tipped to approximately horizontal position, it will be overbalanced so as to quickly flip to an inverted position from which it will instantly discharge its acid contents into the mix M in vat V. As an alternative, the invention contemplates the dispersed injection of acid through a branch line 48 (FIG. 5) of injection means I', line 48 having a normally closed valve 49 which is manually opened to effect discharge of the measured quantity of acid in container 45 into manifold 35. To overcome the hydrostatic pressure of mix M in vat V, container 45 of injection means I' is located at a height above the level of mix M.

THE PROCESS

In executing the process of my invention, the following steps are performed:

(1) Vat V, canisters 26 and pan 25 are cleansed from any prior use;

(2) Cleansed canisters 26 are assembled in pan 25;

(3) Cart C is rolled under vat V in a position such as to center it beneath the vat and to locate its rim 27 above the lowered fingers 31 of jacks 29;

(4) Jacks 29 are operated to elevate the cart into sealing engagement with O-ring 28, and is then attached to and supported from the vat by jacks 29;

(5) The bottom of the vat being closed, it is charged with a measured batch M of starting liquid (whey-milk mix or whey or milk) piped into the vat through filling means F;

(6) The batch of starting liquid is heated by injection of steam through injection means S. Alternatively, the starting liquid may be preheated in a heating tank from which it is transferred to vat V through filling means F;

(7) Vinegar or other suitable acid is introduced into acid container 45. Normally a solution of 1 part vinegar and 2½ parts water is employed;

(8) The measured quantity of acid in container 45 is transferred into the batch M of heated starting liquid either by dumping the container 45 of FIG. 1 or by opening valve 49 of FIG. 5, for dispersed bottom injection;

(9) To hasten the development of curd in situations calling for such action, air is injected through injection means A, a gentle agitation being produced by bubbles of air rising through the batch of mix from the bottom of the vat.

(10) The acidized batch M is retained in the vat for a time sufficient to effect full separation of curd from the starting liquid and flotation of the curd particles to the surface of the whey residue from which the curd has been separated;

(11) When it is determined that full separation has been attained, the whey residue is drained off, first through drain means D1, until the floating layer of curd reaches a level M1 just above outlet 18. This outlet is then closed, and draining is continued through cart C and outlet means D2 to and below bottom drain level M2, where the whey is drained from canisters 26. The floating body of curd, following the subsiding whey into the canisters, is retained therein in separate curd bodies which can subsequently be packaged intact. The whey is drained through the perforations in the sides and bottom of the canisters, thus being strained out of the collected curd bodies. This two-stage draining procedure is especially important where a large percentage of curd fines are developed, or where all of the curd particles are fine. During the later stages of the draining, the floating curd layer, becoming more concentrated as it descends in the lower funnel section 11 of the vat, will sweep the fines before it into the canisters 26. In the earlier stage of draining through outlet means D1, the liquor is strained through strainer lining 16 into drain space 17 from which it leaves through outlet 18. In this connection, athough outlet 18 is shown at an elevation high enough to avoid obscuring the showing of a jack 29, it should preferably be located somewhat nearer the bottom of the vat;

(12) In some instances, as where larger curd particles are developed, simultaneous draining through both outlet 18 and bottom outlet 41 may be employed for faster draining;

(13) When all whey residue has been drained off, the curd, which in the meantime has slowly settled in canisters 26 under minimal hydrostatic head, will have formed into separate curd bodies which can be of sufficiently small size for commercial handling without being divided into smaller cakes. Settling under minimal hydrostatic head avoids pushing the fines through the canister perforations or screen mesh apertures;

(14) When draining is completed, the cart C is released from the vat bottom and lowered by operation of jacks 29, until it rests on the floor. The cart, with its load of curd-containing canisters, is then wheeled to an unloading station where the canisters are removed and their curd body contents abstracted from them for packaging and marketing.

I claim:

1. A method of preparing ricotta cheese from a curd-forming starting liquid, comprising the following steps:

containing said starting liquid in a treatment vat at an elevated temperature at which curd will be developed by acid treatment;

injecting acid into the heated starting liquid to develop curd particles in a body of whey;

allowing the curd particles to rise to form a layer of floating curd at the top of the curd body;

draining the whey downwardly, the draining being completed through a plurality of strainer-canisters communicating with the bottom of the vat;

collecting separate bodies of curd in said canisters;

removing the curd-containing canisters from the vat to an unloading station;

and removing the separate curd bodies from the several canisters.

2. The method defined in claim 1, using a mix of new milk and whey from another cheese process.

3. The method defined in claim 2, wherein the whey and milk are mixed and preheated in a separate tank from which they are transferred into the vat.

4. The method defined in claim 1, wherein the starting liquid is heated by steam injection into such liquid in the vat.

5. The method defined in claim 1, wherein the draining through the canisters is regulated at a slow rate such as to minimize loss of fine curds through the apertures of the strainer-canisters resulting from the dragging action of the draining whey.

6. The method defined in claim 1, including the step of draining the whey at a level below that of the floating curd so as to avoid curd particles being carried off in the draining flow.

7. The method defined in claim 6, wherein there is a first stage of draining at an intermediate level below the major portion of the height of the starting liquid;

and wherein a second stage of draining through said strainer-canisters is effected after the major volume of whey has been drained off at said intermediate level.

8. The method defined in claim 1, wherein a measured quantity of acid is dumped into the body of starting liquid from a container supported above the vat.

9. The method defined in claim 8, wherein air is injected into the body of starting liquid to agitate the same gently to mix the injected acid therewith.

10. The method defined in claim 1, wherein acid is injected into said body of starting liquid through said canisters.

11. Apparatus for preparing ricotta cheese from a curd-forming starting liquid, comprising:

a treatment vat for containing a batch of the starting liquid;

means for injecting acid into said starting liquid to develop curd particles therein;

a plurality of open-top canisters of strainer material communicating with a bottom opening in said vat;

means enclosing said canisters and detachably sealed to said bottom opening to contain whey residue drained through said canisters;

and outlet means for draining said whey residue from said enclosing means.

12. Apparatus as defined in claim 11, including an intermediate drain outlet at a level below the major portion of the height of the starting liquid and above said canisters, for draining off a major portion of said whey residue while a floating layer of separated curd descends to a level near but above said intermediate outlet.

13. Apparatus as defined in claim 11, wherein said canister-enclosing means is a pan having an outwardly extending rim for sealing it to the bottom of the vat.

14. Apparatus as defined in claim 13, wherein said pan is a cart having roller means for transporting it from the vat to an unloading station for removal of the canisters from the pan and removal of their contained curd bodies.

15. Apparatus as defined in claim 11, said canister enclosing means being a flat-bottom pan supporting said canisters in side-by-side assembly therein;

said outlet means including a manifold with individual outlets centered beneath respective assembled canisters in close side-by-side assembly therein.

16. Apparatus as defined in claim 15, including an air-injection inlet communicating with said manifold for injecting air through said individual outlets and upwardly through said canisters into the vat.

References Cited
UNITED STATES PATENTS
3,732,110   5/1973   Pontecorvo _____ 99—116

DAVID M. NAFF, Primary Examiner

U.S. Cl. X.R.

99—452, 453; 426—478, 491